United States Patent [19]
Lee et al.

[11] Patent Number: 5,791,229
[45] Date of Patent: Aug. 11, 1998

[54] CONTROL DEVICE FOR TRAVELLING SYSTEM IN CONSTRUCTION VEHICLES

[75] Inventors: Jin Han Lee, Changwon; In Taek Nam, Migeum, both of Rep. of Korea

[73] Assignee: Samsung Heavy Industries Co., Ltd., Kyung Nam, Rep. of Korea

[21] Appl. No.: 751,199

[22] Filed: Nov. 15, 1996

[51] Int. Cl.[6] ................................................ F15B 11/08
[52] U.S. Cl. ................................................ 91/453; 91/461
[58] Field of Search ............................... 91/453, 461, 459, 91/1

[56] References Cited

U.S. PATENT DOCUMENTS

| | | | |
|---|---|---|---|
| 3,892,079 | 7/1975 | Hirano et al. | 91/459 |
| 4,166,506 | 9/1979 | Tezuka et al. | 91/453 |
| 4,518,043 | 5/1985 | Anderson et al. | 91/453 |
| 4,559,778 | 12/1985 | Krusche | 60/447 |
| 5,463,931 | 11/1995 | Karlsson et al. | 91/461 |

FOREIGN PATENT DOCUMENTS 2022787  12/1979  United Kingdom .

*Primary Examiner*—Sheldon Richter
*Attorney, Agent, or Firm*—Kenyon & Kenyon

[57] ABSTRACT

A control device for a travelling system in construction vehicles is disclosed. The control device applies the pilot pressure of the pilot pump to the spool of the directional control valve separately from the travelling control pedal, thus automatically controlling operation of the directional control valve. However, the manual control mode performed by the travelling control pedals has priority over the automatic control mode. The control device has a proportional control valve, which applies the pilot pressure of the pilot pump to the spool in response to an input current signal. A pressure sensor checks the pilot pressures, which are generated by both the travelling control pedals and the proportional control valves and act on the spool. A controller receives a signal indicative of the pilot pressures checked by the pressure sensor and outputs the current signal to the proportional control valve.

7 Claims, 2 Drawing Sheets

CONTROL DEVICE FOR TRAVELLING SYSTEM IN CONSTRUCTION VEHICLES

BACKGROUND OF THE INVENTION

1. Field of the Invention

The present invention relates in general to a control device for a travelling system in construction vehicles and, more particularly, to a control device suitable for automatically controlling the operation of the travelling system of a construction vehicle.

2. Description of the Prior Art

FIG. 1 shows the hydraulic circuit of a typical travelling system of a construction vehicle. As shown in FIG. 1, the typical travelling system includes a main hydraulic pump P, which is operated by the rotating force of an engine E. A travelling motor M is connected to the hydraulic pump P through a hydraulic passage so that the motor M is operated by the pressurized oil of the pump P. The hydraulic passage extending between the motor M and the pump P is provided with a directional control valve V, which controls supply of the pressurized oil for the motor M thus starting or stopping the motor M or changing the rotating direction of the motor M. In order to operate the above control valve V, the pilot pressure of a pilot pump Pp is applied to the valve V thus moving the spool of the valve V in either direction. The above pilot pump Pp is operated by the engine E. The pilot pressure of the pilot pump Pp is selectively applied to either end of the spool of the control valve V in accordance with a handling signal, which is output from the travelling control pedals D installed in the control cabin of the construction vehicle. Two relief valves R1 and R2 are coupled to the respective pumps P and Pp and limit the pressure of the hydraulic circuit to a predetermined level thereby maintaining the operational safety of the travelling system.

Microprocessors for automatically controlling the operation of the construction vehicles have been actively used recently. However, the use of microprocessors is regrettably limited to control of the working units, such as booms, arms and buckets, of the construction vehicles because the automatic travelling system may cause a safety accident during the operation of the construction vehicles.

Therefore, the travelling system of a construction vehicle has been regrettably operated manually even though the other working units are automatically operated by a controller. The manual travelling system is inconvenient to the operator of a construction vehicle particularly when the construction vehicle carries out construction work while travelling on the ground.

SUMMARY OF THE INVENTION

It is, therefore, an object of the present invention to provide a control device for a travelling system in construction vehicles in which the above problems can be overcome and which automatically controls the operation of the travelling system when a construction vehicle carries out construction work while travelling on the ground.

It is another object of the present invention to provide a control device for a travelling system in construction vehicles which is programmed in order to allow the operator's manual control mode to have priority over the automatic control mode in case of, for example, an emergency thereby improving work efficiency and seeking operational safety of the construction vehicle.

In order to achieve the above objects, the present invention provides a control device for a travelling system in construction vehicles, the travelling system including an engine, main and pilot pumps, a travelling motor, a directional control valve, and a travelling control pedal, wherein the control device comprises valve control means for applying a pilot pressure of the pilot pump to a spool of the directional control valve separately from the travelling control pedal, thus controlling operation of the directional control valve in a way such that a control mode performed by operating the travelling control pedal has priority over a control mode performed by the valve control means.

In the preferred embodiment, the valve control means comprises a proportional control valve coupled to a pilot line extending between the pilot pump and the directional control valve's spool and adapted for applying the pilot pressure of the pilot pump to the spool in response to an input current signal; a pressure sensor adapted for checking pilot pressures, one pilot pressure being generated by the travelling control pedal and acting on the spool and the other pilot pressure being generated by the proportional control valve and acting on the spool; and a controller receiving a signal indicative of the pilot pressures checked by the pressure sensor and outputting the current signal to the proportional control valve.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
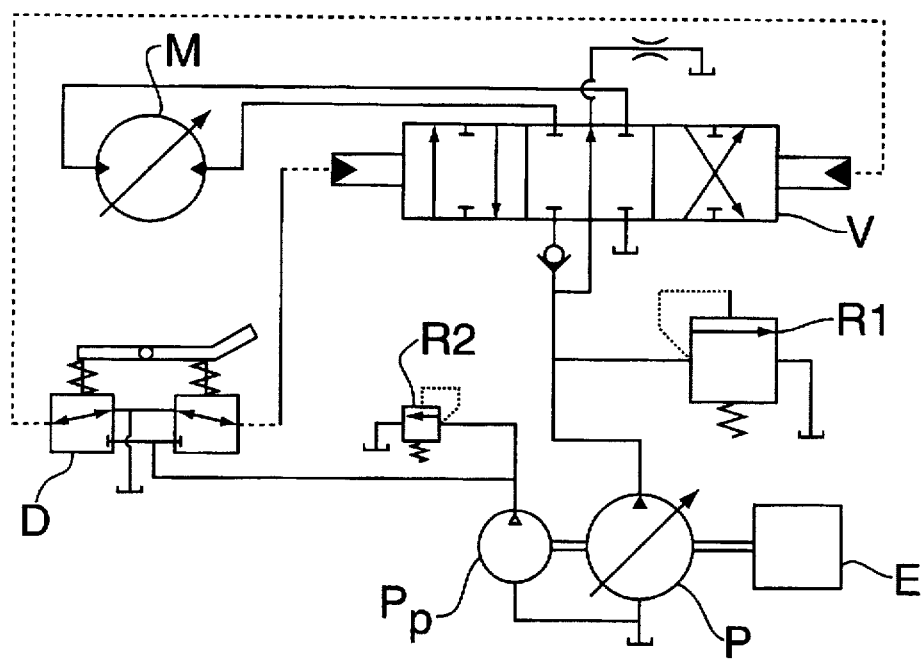
FIG. 1 is the hydraulic circuit of a typical travelling system of a construction vehicle.
Figure 2:
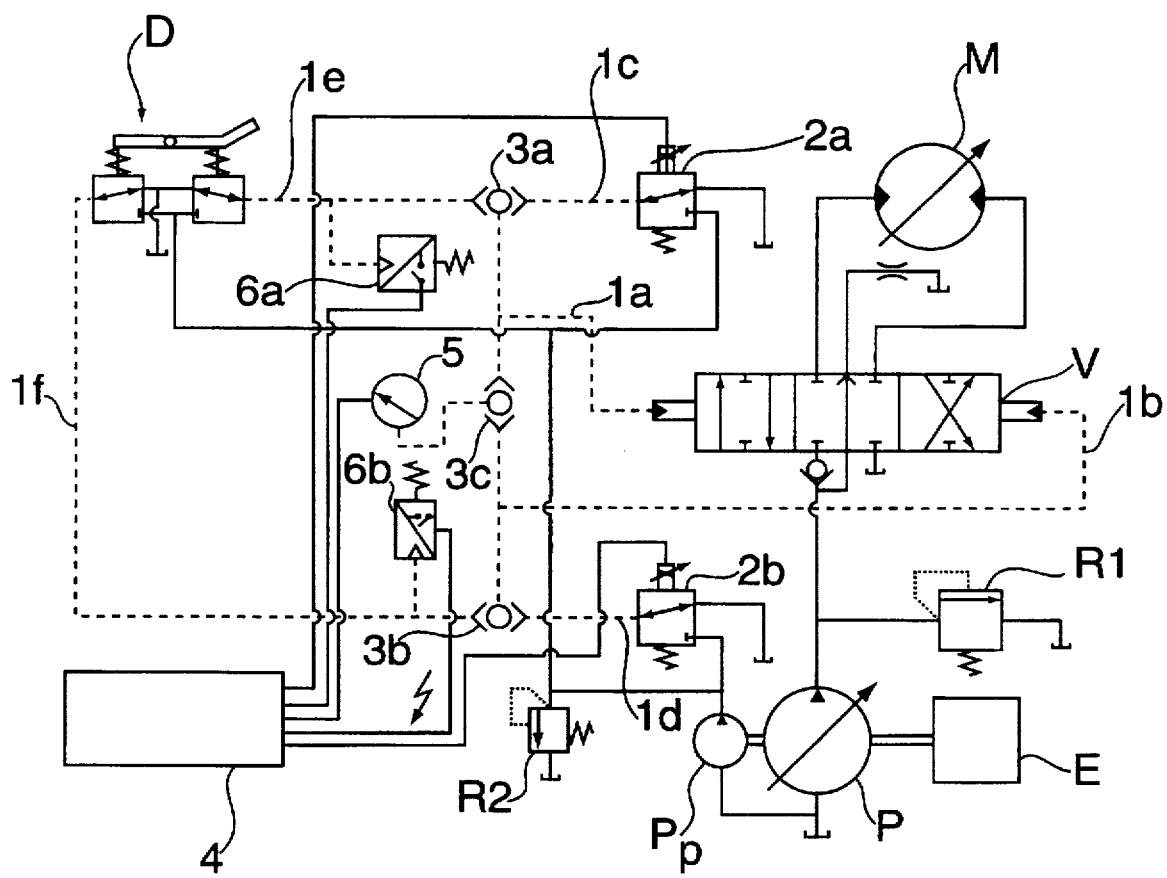
FIG. 2 is the hydraulic circuit of a travelling system in accordance with the preferred embodiment of the present invention.

FIG. 2 shows the hydraulic circuit of a travelling system according to the preferred embodiment of the present invention. As shown in FIG. 2, the travelling system of this invention includes a main hydraulic pump P, which is operated by the rotating force of an engine E. A travelling motor M is connected to the hydraulic pump P through a hydraulic passage so that the motor M is operated by the pressurized oil of the pump P. The hydraulic passage extending between the motor M and pump P is provided with a directional control valve V, which controls supply of the pressurized oil for the motor M thus starting or stopping the motor M or changing the rotating direction of the motor M. In order to operate the above control valve V, the pilot pressure of a pilot pump Pp is applied to the valve V thus moving the spool of the valve V in either direction. The above pilot pump Pp is operated by the engine E. The pilot pressure of the pilot pump Pp is selectively applied to either end of the spool of the control valve V in accordance with a handling signal, which is output from the travelling control pedals D installed in the control cabin of the construction vehicle. Two relief valves R1 and R2 are coupled to the respective pumps P and Pp and limit the pressure of the hydraulic circuit to a predetermined level thereby maintaining the operational safety of the travelling system.

The control device for the above travelling system includes a valve control means, which applies the pilot pressure of the pilot pump Pp to the spool of the directional control valve V separately from the travelling control pedals D, thus controlling operation of the directional control valve V. In this case, the control mode performed by the travelling control pedals D has priority over a control mode performed by the valve control means. In the preferred embodiment of this invention, the valve control means comprises two proportional control valves 2a and 2b, which are coupled to the respective pilot lines 1a and 1b extending between the pilot pump Pp and both ends of the directional control valve's spool, respectively. When the above proportional control valves 2a and 2b receive current signals, the valves 2a and 2b proportionally open the pilot lines 1a and 1b thus forming the pilot pressures acting on both ends of the directional control valve's spool. The pressurized pilot oil of the pilot pump Pp is applied to both the travelling control pedals D and the proportional control valves 2a and 2b. The pilot lines 1c and 1d for the proportional control valves 2a and 2b are coupled to the pilot lines 1e and 1f for the travelling control pedals D at respective shuttle valves 3a and 3b and in turn extend to the pilot lines 1a and 1b for the directional control valve V, respectively.

Meanwhile, the hydraulic circuit also has a controller 4, which receives the feedback pilot pressure acting on both ends of the directional control valve's spool and outputs the above current signals to the proportional control valves 2a and 2b. The above controller 4 receives the feedback pilot pressures of the pilot lines 1a and 1b by the pressure sensor 5, which is coupled to the pilot lines 1a and 1b and the shuttle valve 3c.

Two pressure switches 6a and 6b are coupled to the pilot lines 1e and 1f extending to the travelling control pedals D. The above pressure switches 6a and 6b check the pilot pressures of the pilot lines 1e and 1f extending to the travelling control pedals D and output checking signals, indicative of the handling values of the pedals D, to the controller 4.

The above travelling system is operated as follows.

In case of an automatic travelling control mode, the proportional control valves 2a and 2b are operated in response to the control signals output from the controller 4, thus forming a pilot pressure. The pilot pressure in turn is applied to the spool of the directional control valve V by way of the shuttle valves 3a and 3b so that the spool moves in either direction and starts the travelling motor M. In the above state, the pilot pressure is fed back to the controller 4 by the pressure sensor 5 thus allowing the controller 4 to continuously control the operation of the travelling motor M.

In case of a manual travelling control mode, the operator of the construction vehicle operates the travelling control pedals D so that the pedals D form a pilot pressure. Due to the above pilot pressure, the pressure switches 6a and 6b are turned on and output signals to the controller 4 thereby informing the controller 4 that the travelling system is brought into the manual travelling control mode. When the pedals D are operated by the operator during an automatic control mode where the controller 4 outputs the current signals to the proportional control valves 2a and 2b and automatically controls the travelling system, the controller 4 stops outputting the current signal to the valves 2a and 2b. Meanwhile, the pilot pressure caused by operation of the pedals D is applied to the spool of the directional control valve V by way of either shuttle valve 3a or 3b thus moving the spool in either direction and starting the travelling motor M.

In accordance with the present invention, it is preferable to store data, concerning the operation of the travelling control pedals D in a manual operation of the travelling system, in the memory of the controller 4 and use the stored data in order to automatically control the travelling system in a next operation of the travelling system. In order to achieve the above object, the pilot pressure generated by the operated pedals D is checked by both the pressure sensor 5 and the pressure switches 6a and 6b and in turn is applied to the controller 4 thus being stored in the memory of the controller 4. In the above case, the travelling system must have a function select switch (not shown), which is used for selecting a function for storing data, concerning the operation of the pedals D in a manual operation of the travelling system, in the memory of the controller 4 or a function for repeating the operation of the travelling system based on the stored data. When the above select switch is turned on in order to select the data storing function, both the output signal of the pressure switches 6a and 6b and the pilot pressure checked by the pressure sensor 5 are applied to the controller 4. The controller 4 stores the signal and pilot pressure in the form of data in the memory. When the repeating function of the select switch is selected, the operation of the travelling system is automatically repeated in accordance with the stored data.

Figure 3:
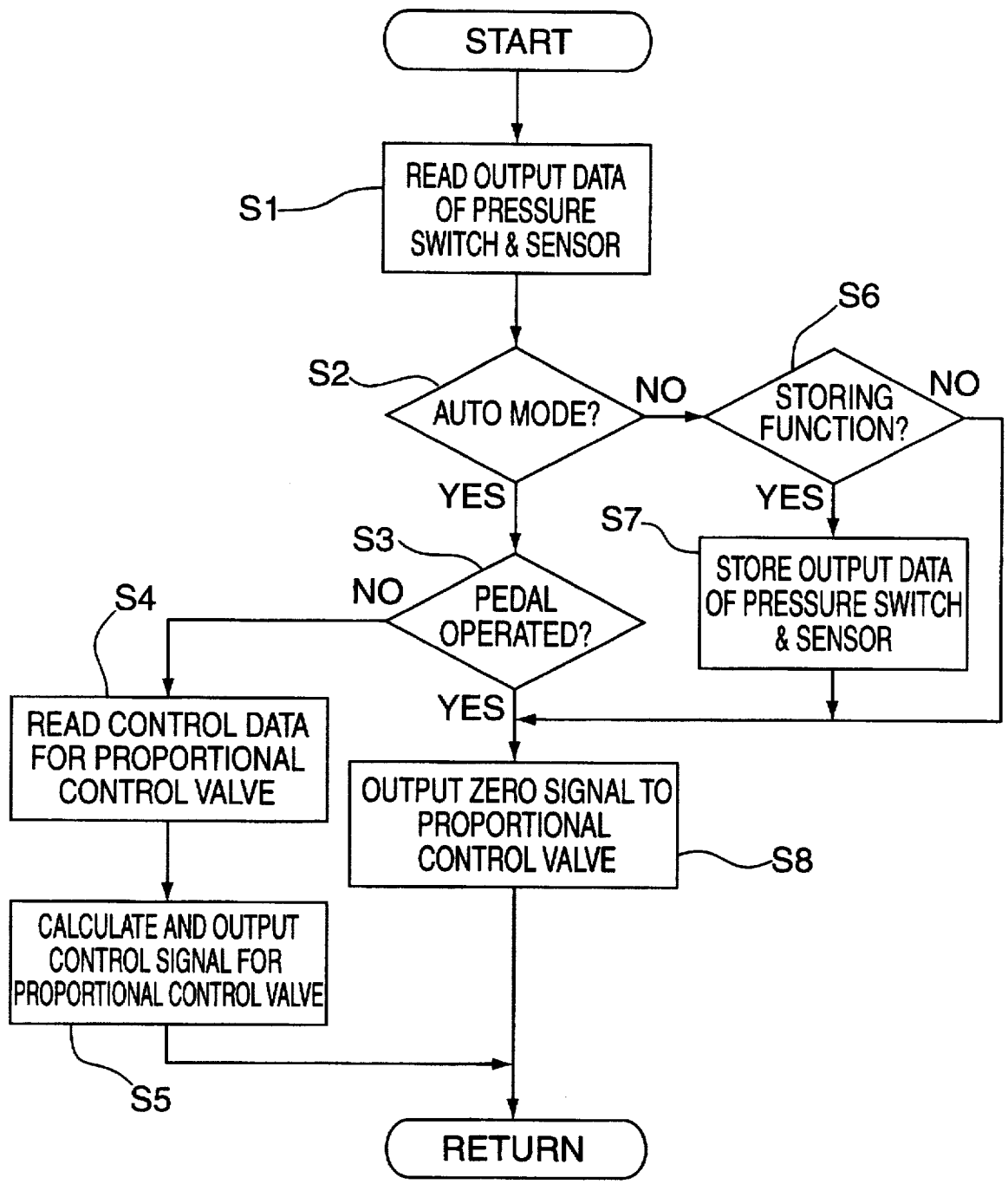
FIG. 3 is a flowchart of the travelling system control process according to the present invention.

FIG. 3 is a flowchart of the travelling system control process according to the present invention.

In operation of the travelling system, at step 1 the controller 4 receives signals, indicative of the pilot pressures, from the pressure switches 6a and 6b and pressure sensor 5. At step 2, the controller 4 checks the operational mode of the travelling system in accordance with the input signals. That is, the controller 4 checks whether an automatic control mode has been performed.

When it is determined that the travelling system is operated in an automatic control mode, at step 3 the controller 4 checks the signal output from the pressure switches 6a and 6b thus determining whether the pedals D have been operated. When it is determined that the pedals D have not been operated, at step 4 the controller 4 receives data for controlling the proportional control valves 2a and 2b. Upon receiving the data for controlling the proportional control valves 2a and 2b, at step 5 the controller 4 processes the input data prior to outputting control signals to the proportional control valves 2a and 2b. Thereafter, the process is returned to step 1.

Meanwhile, when the travelling system is operated in a manual control mode, at step 6 the controller 4 checks whether the data storing function of the function select switch has been selected. When the data storing function of the function select switch has been selected, at step 7 the controller 4 stores data, concerning both the output signals of the pressure switches 6a and 6b and the pilot pressure checked by the pressure sensor 5, in the memory. The stored data are used for automatically repeating the operation of the travelling system in a next operation.

When either the data storing function of the function select switch has not been selected or the data has been stored in the memory, at step 8 the controller 4 outputs a zero signal to the proportional control valves 2a and 2b prior to returning to step 1.

When at step 3 the controller 4 determines that the travelling control pedals D have been operated, the controller 4 processes step 8 in order to output a zero signal to the proportional control valves 2a and 2b prior to returning to step 1. In the control device according to this invention, the manual control mode has priority over the automatic control mode thus maintaining the operational safety of the travelling system particularly in case of emergency.

As described above, the present invention provides an automatic control device for a travelling system in construction vehicles. The control device automatically controls the operation of the travelling system thus improving work efficiency when a construction vehicle carries out construction work while travelling on the ground. The above control device is programmed in order allow the manual control mode to have priority over the automatic control mode, thereby seeking operational safety of the construction vehicle in case of, for example, an emergency.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A control device for a travelling system in construction vehicles, said travelling system including an engine, main and pilot pumps, a travelling motor, a directional control valve, and a travelling control pedal, wherein the control device comprises:

valve control means for applying a pilot pressure of said pilot pump to a spool of said directional control valve separately from said travelling control pedal, thus automatically controlling operation of said directional control valve in a way such that a control mode performed by said travelling control pedal has priority over an automatic control mode performed by said valve control means, wherein said valve control means comprises:

a proportional control valve coupled to a pilot line extending between said pilot pump and said directional control valve's spool and adapted for applying the pilot pressure of the pilot pump to said spool in response to an input current signal;

a pressure sensor adapted for checking pilot pressures, one pilot pressure being generated by said travelling control pedal and acting on said spool and the other pilot pressure being generated by the proportional control valve and acting on said spool; and a controller receiving a signal indicative of the pilot pressures checked by said pressure sensor and outputting said current signal to said proportional control valve.

2. The control device according to claim 1, further comprising a shuttle valve coupling a first pilot line extending to the proportional control valve and a second pilot line extending to the travelling control pedal together and in turn connecting said first and second pilot lines to the pilot line extending to said directional control valve's spool.

3. The control device according to claim 2, further comprising a pressure switch coupled to the pilot line extending to the travelling control pedal and adapted for checking the pilot pressure of the pilot line extending to the travelling control pedal, and outputting a signal to said controller in order to give information concerning the operation of said travelling control pedal to the controller.

4. The control device according to claim 1 further comprising a pressure switch coupled to the pilot line extending to the travelling control pedal and adapted for checking the pilot pressure of the pilot line extending to the travelling control pedal, and outputting a signal to said controller in order to give information concerning the operation of said travelling control pedal to the controller.

5. The control device according to claim 4, wherein said controller includes means for storing data output from both said pressure switch and said pressure sensor and using the stored data in a next operation of the travelling system thereby automatically controlling the travelling system.

6. The control device according to claim 4, wherein when said travelling control pedal has been operated, the controller stops outputting the current signal to the proportional control valve.

7. The control device according to claim 6, wherein said controller includes means for storing data output from both said pressure switch and said pressure sensor and using the stored data in a next operation of the travelling system thereby automatically controlling the travelling system.

* * * * *